United States Patent Office 2,957,544
Patented Oct. 25, 1960

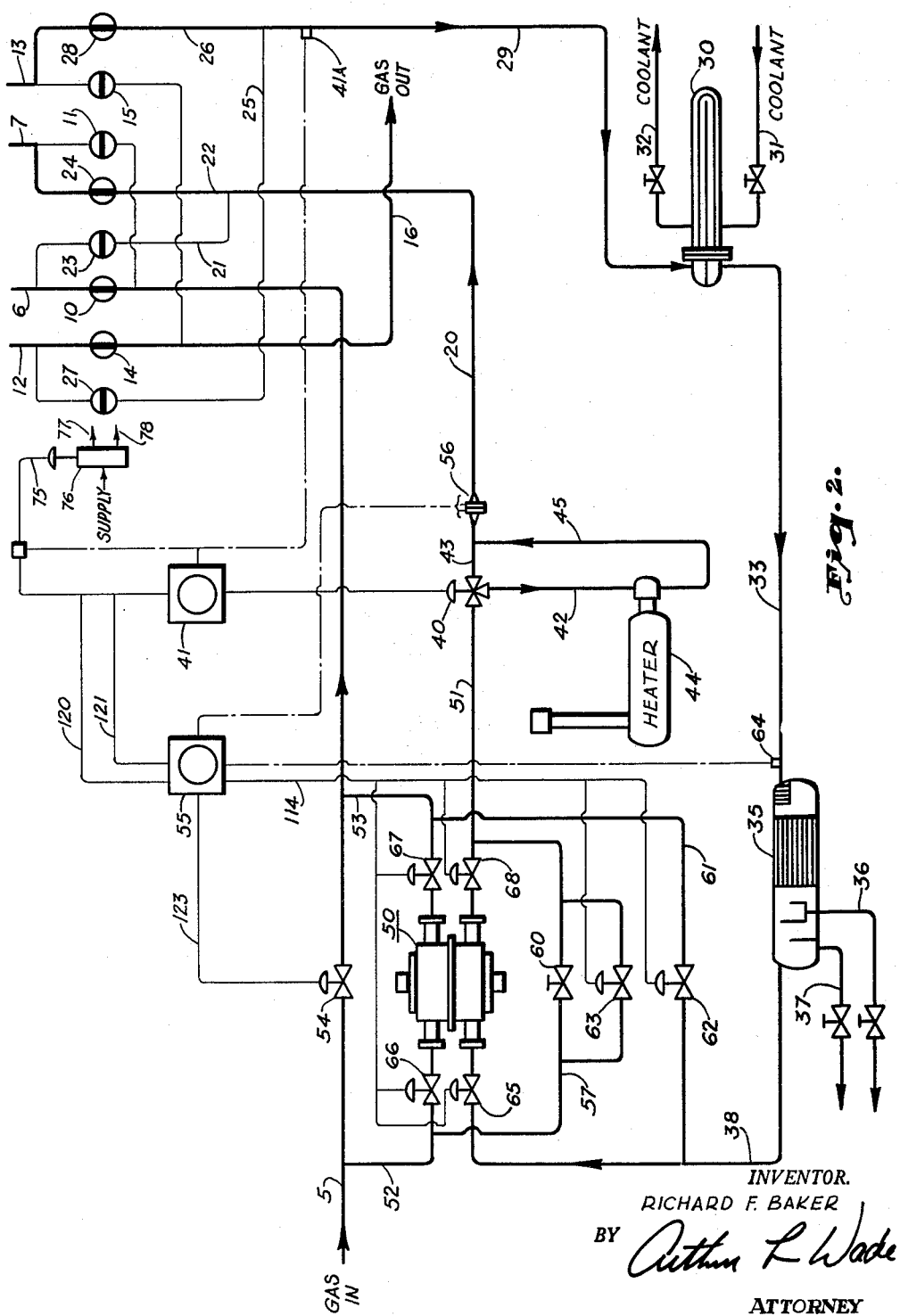

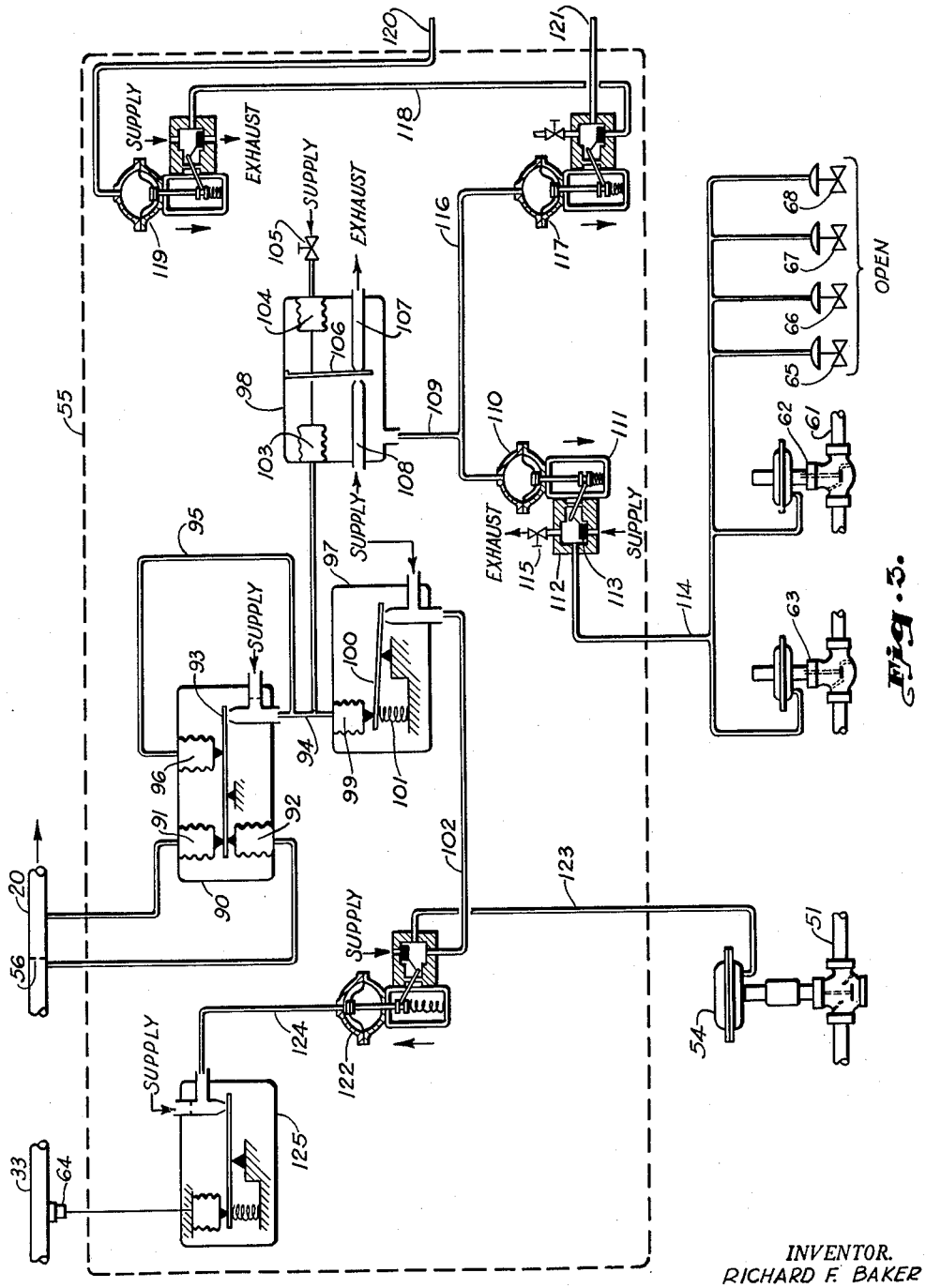

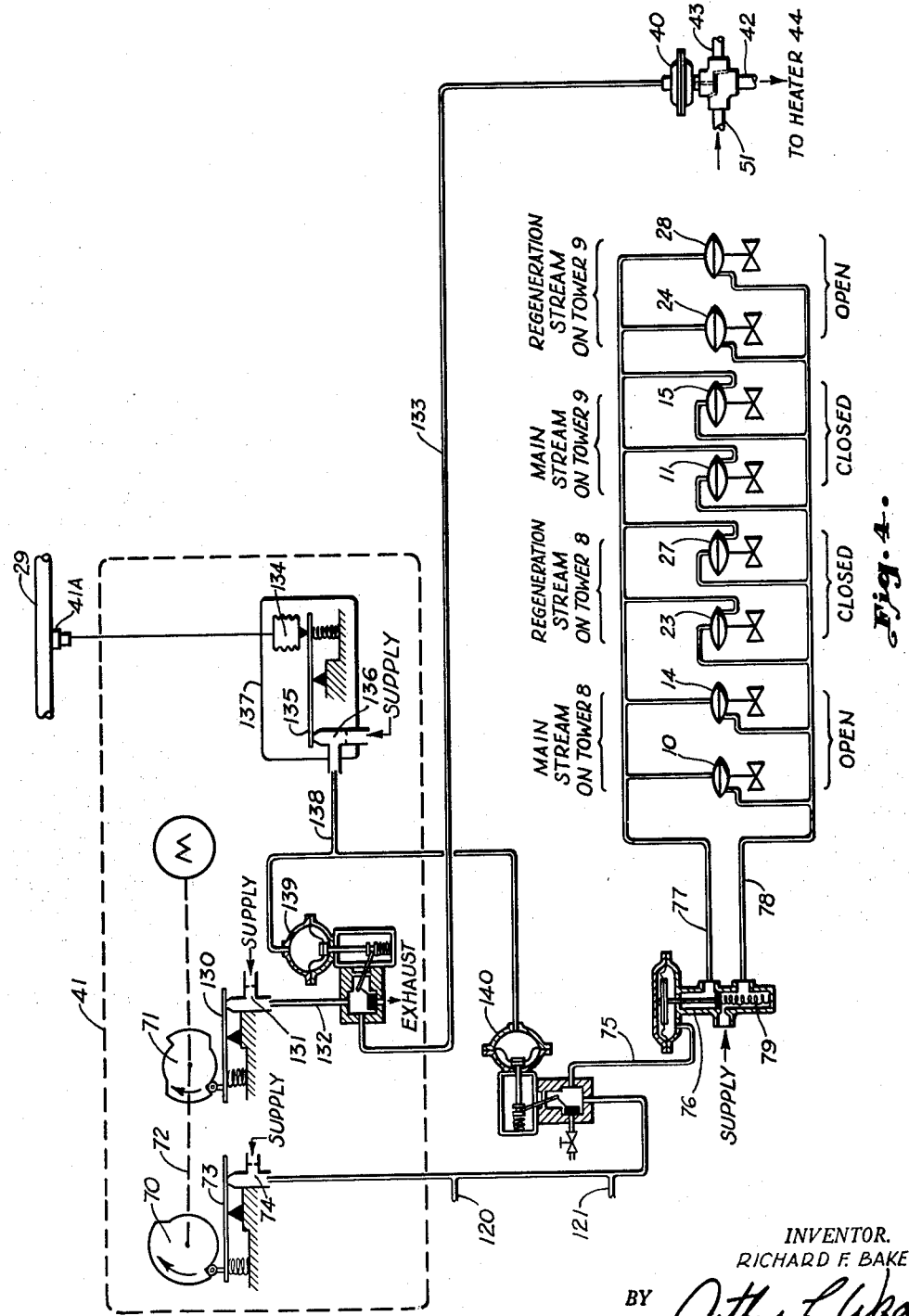

2,957,544

CONTROL SYSTEM FOR CLOSED CYCLE GAS DE-HYDRATION AND HYDROCARBON RECOVERY SYSTEM

Richard F. Baker, Tulsa, Okla., assignor to National Tank Company, Tulsa, Okla., a corporation of Nevada Filed Dec. 19, 1958, Ser. No. 781,760

39 Claims. (Cl. 183—4.1)

This invention relates to systems for processing natural gas to remove moisture and condensable hydrocarbons. More specifically, the invention relates to closed cycle dehydration and hydrocarbon recovery systems.

For the purposes of disclosing his invention, the flow of gas to be processed will be referred to as the flow, or main stream. The flow, or main, stream of natural gas from a well head is always saturated, or partially saturated, with moisture in accordance with its origin, pressure and temperature. If the gas is transmitted with this moisture in it, it may severely corrode the metal pipe line through which it is transmitted. Further, this moisture, at lowered temperatures, may form hydrates with hydrocarbons which will clog the pipe lines and valves. It is common practice to conduct wet gas through large cylinders filled with adsorbent material. Using at least two cylinders, it is possible to continuously transmit gas through adsorbent by alternating between the towers. The towers, with adsorbent material at least partially saturated with moisture, are reactivated with either heated air or gas.

Additionally, it is recognized that such streams of natural gas are saturated, or partially saturated, with valuable condensable hydrocarbons, such as gasoline, which can be removed from the gas stream by adsorbent material. The removal of both the condensable hydrocarbons and water from natural gas streams, prior to or during transmission is possible with a common adsorbent material and must be done efficiently and economically. Many of the problems of water and hydrocarbon removal by adsorbent material center about the use of the reactivation, or regeneration, fluid with which the water and hydrocarbons are removed from the saturated adsorption material. It has been customary to split off a portion of the saturated stream and use it for this purpose. The split-off, reactivation, stream is passed through a heater to elevate its temperature to a degree that will raise its ability to vaporize and remove water and hydrocarbons as it passes through the beds of adsorption material. After passage through the beds the reactivation stream is cooled in a condenser to extract the liquids. The output of the condenser is received in a separator where the water and hydrocarbons are removed as separate liquid phases. The prior art shows how the gaseous portion of the reactivation stream may be returned to the main stream on its way through the adsorption step. However, there are fundamental advantages to recycling the reactivation fluid rather than returning it to the flow, or main, stream. Regardless of whether the reactivation stream is returned to the main stream, or recycled as a captive stream, there is the problem of providing energy for its circulation through the heater, adsorption material, condenser and separator.

The captive reactivation, or regeneration, fluid of an adsorption process can be circulated with the power of the main stream. A mechanical device in the form of a motor-compressor, can be arranged to bridge between the two circuits in transferring the energy of the flow in the main stream to the flow in the captive regeneration stream for circulating the regeneration gas through the captive circuit.

When the valves in both the main and regeneration circuits are actuated to shift their flows between the plurality of adsorption towers, mechanical lag in certain designs of these valves permits a partial interchange of fluids between the two circuits under the force of their pressure differential. The cross-over connection between the input to the motor and the output from the compressor will transfer so much fluid between the main stream and the captive stream during the period of valve switch-over that the differential pressure across the motor will drop to substantially zero. The motor-compressor will momentarily stop, and then start up suddenly, when the valve switch-over is completed. The resulting strain on the motor-compressor is so great that frequent mechanical failures of the motor-compressor result.

Another problem that exists with closed cycle reactivation types of dehydration and hydrocarbon recovery systems is progressive mechanical failure of the motor-compressor, resulting in gradual loss of circulating flow in the captive regeneration circuit. Additionally, other variables of the system have caused temperatures in the closed circuit to exceed safe predetermined values. It is desirable, when such operatives conditions appear in the captive reactivation circuits, to isolate the motor-compressor from the system and to convert the system to an open cycle regeneration system for at least the period required to correct the condition.

When an operative temperature condition of the closed, or captive, regeneration circuit of a dehydration system exceeds its predetermined limit, there is a danger that excessive heat will be placed in the outgoing processed stream. Severe thermal shocks can result when continuing adsorption tower switching causes the processed stream to pass through a tower where temperature has not been brought down to a predetermined level. The resulting thermal shock can rupture downstream transmission lines and vessels, causing extensive financial loss.

A principal object of the present invention is to convert a closed cycle type of reactivation dehydration and hydrocarbon recovery system to an open cycle type of regeneration system when an operative variable of the regeneration circuit reaches a predetermined value.

Another object is to control the cross-feed circuit between the main stream of gas to be dehydrated and the captive, or closed, cycle of the regeneration stream of gas to maintain a predetermined minimum differential pressure across the motor driven by the main stream during switching of the main and captive streams to adsorption towers.

Another object is to isolate the motor driven by the main stream, and the compressor, from the regeneration stream when conversion from a closed cycle to an open cycle is made.

Another object is to maintain control of the differential pressure drop developing the force for circulating the reactivation gas, by the flow through the reactivation circuit, when the dehydration system is using a closed cycle type of regeneration and after it is converted to using an open cycle type of regeneration.

Another object is to maintain the connections between the main and regeneration streams and adsorption towers that existed at the time one of the operative variables of the regeneration cycle reaches a predetermined value.

The present invention contemplates a first circuit for conducting natural gases of the circuit through a bed of adsorbent material in order to remove water and hydrocarbons from the gas by contact with the adsorbent material and supplying power to a motor. A second circuit is arranged to be driven by a compressor powered by the motor to alternately conduct a reactivating, or regenerating, gas through a heating zone and then the bed of adsorbent material. A first conduit is arranged between the second circuit and the first circuit, upstream of a differential valve in the first circuit. A second conduit is arranged between the inlet to the compressor and the outlet from the motor. A valve is included in the second conduit. A means is arranged to detect an operative condition in the second circuit and open the valve in the second conduit to permit free communication between the second circuit and the first circuit when the operative condition reaches a predetermined value in converting the system from a closed to an open cycle type of regeneration system.

The invention further contemplates that the first conduit arranged to connect between the second circuit and a point upstream of the differential valve in the first circuit include a throttling valve to maintain a minimum differential pressure across the motor during the period of switching the circuit connections to the adsorbent bed in the closed cycle of regeneration system.

The invention further contemplates a by-pass conduit around the throttling valve in the first conduit and a valve in this by-pass conduit which will be actuated by the means detecting the operative condition in the second circuit to open the valve in the by-pass conduit around the throttling valve in the first conduit at the same time the valve in the second conduit is opened by the means detecting the operative condition in the second circuit in converting the cycle.

The invention further contemplates a valve in each inlet and outlet of both the motor and compressor which can be actuated manually, or automatically, by the means arranged to detect an operative condition in the second circuit, to isolate the motor-compressor from the system when conversion takes place from a closed to an open cycle type of reactivation system.

The invention further contemplates the differential valve arranged between the connections of the motor to the first circuit of the main stream, and the connections of the first and second conduits to the first circuit of the main stream, which will be regulated by the flow of regeneration gas to develop the differential pressure of the regeneration circuit required to circulate its gas on both closed and open cycle type of regeneration systems.

The invention further contemplates a valve system controlled by a time-cycle controller to alternately pass gas to be dehydrated in a first circuit and reactivating gas in a second circuit through beds of adsorbent material. The impulses from the time-cycle controller are applied to the valve system under the monitoring of means detecting an operative condition in the second circuit in order to maintain the valve system in the position it had when the operative condition reaches its predetermined value.

The invention further contemplates monitoring the time-cycle controlling of the valve system directing gas through the adsorbent material with means detecting a temperature of the second circuit directly associated with the temperature of gas going through the compressor. Predetermined excessive temperature values at this point in the second circuit prevent the differential valve from being modulated from flow of regeneration gas in the second circuit and hold the differential valve open. The motor-compressor will be stopped and the flow through the second circuit slows to a value which will cause the valve system to hold the position it possessed when the excessively high temperature developed.

The invention further contemplates monitoring the time-cycle controlling of the valve system directing gas through the adsorbent material with means detecting a temperature of the second circuit directly associated with the regeneration gas leaving the adsorbent material. Predetermind excessive temperature values at this point in the second circuit directly cause the valve system to hold the position it possessed when the excessively high temperature developed. Simultaneously, the excessive temperature value causes the regeneration gas to bypass a heating device to cool the regeneration gas through the adsorbent material to the capacity of the system.

Other objects, advantages and features of this invention will become more apparent to one skilled in the art upon consideration of the written specification, appended claims, and the attached drawings wherein;

Fig. 2 is an enlarged portion of Fig. 1 showing the complete control system responding to, and controlling, variables of the recovery system;

Fig. 3 is a detailed diagrammatic showing of a part of the complete control system in which the invention is embodied; and Fig. 4 is a detailed diagrammatic showing of the remaining part of the complete control system in which the invention is embodied.

Figs. 1 and 2 are to be considered together. Fig. 2 shows structure which is a portion of the structure of Fig. 1 on a larger scale.

Figure 1:
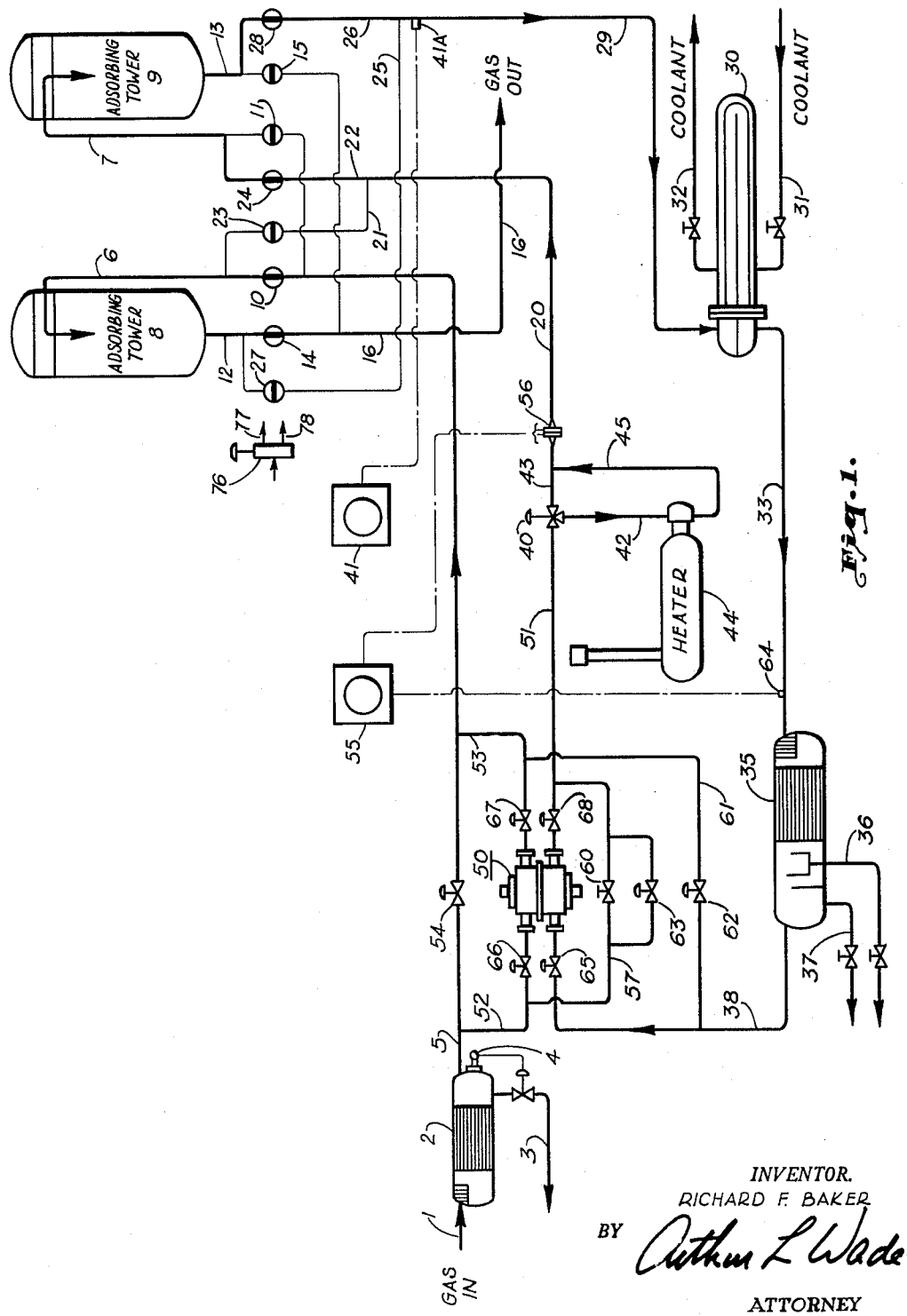
Fig. 1 is a diagrammatic flow diagram of a hydrocarbon recovery and dehydration system which is controlled by a system embodying the present invention.

Temperature is sensed at two points in the system disclosed in Figs. 1 and 2. A flow of the system is also detected. These variables develop forces which are applied to the valve system disclosed. If Fig. 1 were utilized alone, the scale employed to show the complete recovery and dehydration system would be greatly encumbered with the interconnecting control pipes and conduits. Therefore, in Fig. 1, only the variables sensed are indicated as connected to instruments responsive to their signals. Fig. 1 becomes a representation of the related flow patterns for the two basic circuits.

Fig. 2 shows the complete control system, but the towers and liquid knockout have not been shown in order for the scale of the drawing to be enlarged to where all controlling, and controlled, elements can be shown with a minimum of confusion.

First circuit

In Fig. 1, conduit 1 represents the means of bringing natural gas into the adsorption process controlled in accordance with the invention. The gas of conduit 1 is to be dried in the process and its condensable hydrocarbon content extracted. Conduit 1 specifically introduces the gas into separator 2.

Separator 2 may take any of several well-known forms. Any well-known form of vessel in which liquid and gaseous phases separate will be satisfactory. The separation process carried on in separator 2 is a relatively crude function of knocking the liquids which arrive in conduit 1 from the gas stream. The liquids may be both water and hydrocarbons and are removed through conduit 3, controlled by level controller 4. The gaseous phases pass from separator 2 by way of conduit 5.

Conduit 5 is a part of the first circuit of the process which handles the main, or flow, stream of natural gas from which condensable hydrocarbons and water are removed by adsorption. Conduit 5 is divided into branch conduit 6 and branch conduit 7 in order to conduct the main stream through adsorbent beds. These branch conduits specifically connect to adsorbing tower 8 and adsorbing tower 9 and are valved to alternately direct the gas of conduit 5 through beds of adsorbent material in these towers. As illustrated, the towers are, essentially, cylinders with their longitudinal axes extended vertically. The flows from conduits 6 and 7 are directed downwardly through these towers.

Valve 10 in branch conduit 6 and valve 11 in branch conduit 7 alternately open and close to direct the main stream of conduit 5 through the adsorbent beds. Branch conduit 6 is represented with a relatively heavy line of drawing on each side of its valve 10, to indicate that the main stream is passing through valve 10 and into tower 8.

Conduit 12 removes gas from tower 8. Conduit 13 removes gas from tower 9. Valves 14 and 15 alternately direct the main, or flow, gas stream from the towers into conduit 16. Conduit 12, through valve 14, is represented by a heavy line in order to indicate that the flow stream is passing from tower 8 into outlet conduit 16. The main circuit is now more completely defined as conduit 5 passing through valve 10 and valve 14 to conduit 16, as shown in Fig. 1, or alternately through valve 11 and valve 15 to conduit 16. The two sets of valves are time-cycled between their two positions to alternately open and close in directing the main stream through the two adsorbent beds as each bed approaches saturation with water and condensable hydrocarbons.

Adsorbent material

Various types of adsorbent material may be employed in towers 8 and 9. Silica gel has been successfully used to recover a large percentage of the condensable hydrocarbons in main streams. The selection of the specific adsorption material, and the arrangement of flow within the towers, depends on specific design conditions which are not considered further.

Once the adsorbent material has adsorbed the water and condensable hydrocarbons from the main stream, another stream of gas is required to remove these products from the bed. Specifically, a gas stream is passed through the bed, heated enough to vaporize the water and hydrocarbons. The adsorbent bed is thereby reactivated so it can again be used to remove another quantity of water and hydrocarbons from the main stream. The heated gas stream, with the vaporized water and hydrocarbons contained therein, is then cooled to condense the water and hydrocarbons.

Second circuit

The circuit for the reactivation stream of gas is referred to as the second circuit and is traced as including conduit 20. Branch conduits 21 and 22 alternately pass the reactivation gas from conduit 20 through towers 8 and 9. Branch conduit 21 is connected to conduit 6 between valve 10 and tower 8. Branch conduit 22 is connected to conduit 7 between valve 11 and tower 9. Conduit 21 passes through valve 23 and conduit 22 passes through valve 24. Conduit 22 is represented in heavy outline to indicate that the reactivation gas from conduit 20 is passing to tower 9 at the same time the main stream from conduit 5 is being passed to tower 8.

The reactivation gas passed through the towers is also removed through conduits 12 and 13. However, valves 14 and 15 are switched to prevent this reactivation gas from passing out of the system through conduit 16. Conduits 25 and 26 connect to conduits 12 and 13 between valves 14 and 15 and their respective towers. Valves 27 and 28 are included in conduits 25 and 26 in order to alternately pass the reactivation gas into conduit 29. Conduit 26 is represented in heavy line to show the circuit for the reactivation gas is completed through tower 9 from conduit 20 to conduit 29.

Recovery from reactivation gas

The vaporized hydrocarbon and water in the heated reactivation gas of conduit 29 is condensed therefrom in order to remove the water and recover the hydrocarbons. Several choices of cooling sources may be available for condensing these liquids from the reactivation gas in conduit 29. The one, or combination, of sources selected is a matter of design, involving the characteristics of the particular main stream, the availability of relatively cool fluids, size of equipment, and etc.

In Figs. 1 and 2 the reactivation stream of conduit 29 is illustrated as being simply cooled by an available stream of coolant, such as water. Heat exchanger 30 is shown as bringing the coolant of conduits 31 and 32 into intimate association with the captive, reactivation, stream of conduit 29. Vaporized hydrocarbons and water are thereby condensed into liquid and the mixture of condensed liquids and uncondensed gas is passed into conduit 33.

Three-phase separation of the mixture of liquids and gas in conduit 33 takes place in separator 35, one of many well-known forms. The liquefied hydrocarbons are removed through conduit 36, conducted to a stabilizer, and/or storage, not shown. Water is removed through conduit 37 for disposal. The remaining, cooled, reactivation gas is then delivered to conduit 38 for return to conduit 20 for the work of cooling the adsorption beds and removing additional water and hydrocarbons from the beds.

Cooling towers 8 and 9

Using the specific arrangement shown in Fig. 1, it is reviewed that tower 9 is shown with a hot stream of reactivation gas passing through it in order to vaporize the hydrocarbons and the water left in the bed by the main stream. After this vaporization step, the bed within tower 9 should be cooled before the main stream is again passed through it. Cooling of the bed in tower 9 will raise its adsorptive capacity. Further, cooling the bed of tower 9 will prevent its heat being passed into conduit 16 when the main stream is passed through it.

Dumping too much heat from tower 9 into the main stream of conduit 16 would be dangerous. The resulting rise in temperature in the conduit 16 could buckle transmission lines and rupture connections and equipment downstream of the process, requiring costly repairs and replacements. Therefore, a portion of the reactivation period for tower 9 is preferably used to pass a cooling stream of fluid through the bed of tower 9. Usually, it is preferable to simply bypass a heater provided for the reactivation circuit so the cool stream in conduit 38 upstream of the heater will reduce the temperature within the tower 9. It might also be feasible to route at least a portion of the main stream leaving tower 8 through tower 9 for this purpose if the heat balance of the system kept the temperature rise of the processed gas in conduit 16 low enough to protect the components downstream.

To carry out the technique of utilizing the captive, regeneration, stream itself to cool tower 9, valve 40 is provided to alternately pass the cool stream of conduit 38 through a heating source or directly into conduit 20. A time-cycle controller 41 is utilized to allocate the portion of each cycle used for this purpose. Controller 41 also contains a time-cycle mechanism whereby the two sets of tower valves may be switched to alternate the towers between the main and the reactivation streams.

As the heat from the towers 8 and 9 is so important, a temperature responsive element 41A is placed in conduit 29, below the junction of branch conduit 25 and 26. Element 41A actuates a relay in the circuit between the time-cycle controller 41 and the tower valves. Should the temperature out of the tower on regeneration not be sufficiently low to safeguard downstream equipment, element 41A will hold the valves in the position they had when the excessive temperature was reached.

Valve 40 routes the cool stream of conduit 38 through either conduit 42 or 43.

Conduit 42 takes the cool stream through heater 44 to pick up the heat required for reactivation of the adsorbent material. Conduit 45 receives the heated reactivation stream and passes it directly to conduit 20. Thus, valve 40 routes the cool stream of the second circuit from conduit 38 to conduit 20, alternately heated for predetermined times prior to passage through the towers.

Actual operating conditions

It is reasonable to expect about 80° F. temperature and 1200 pounds per square inch or more for a main stream received by the process. The reactivation gas of conduit 20 may be elevated to the order of 600° F. in order to vaporize the hydrocarbons and water in the adsorbent beds. In passing through a tower, the heated reactivation stream may be dropped to the order of 360° F. To condense liquids from this reactivation gas, condenser 30 may drop the temperature to the order of 85° F. Thus it can be seen that conduit 20 receives the reactivation gas at a wide range of temperature values. Conduit 43 may deliver the reactivation gas in the order of 85° to 100° F. while conduit 45 may deliver the reactivation gas to conduit 20 in the order of 600° F.

*Motor-compressor 50*

Figs. 1 and 2 illustrate a mechanical means to transfer the flow energy of the main stream in conduits 1 and 5 to the reactivation, or captive, circuit. This mechanical link is specifically embodied in a motor-compressor 50 such as disclosed and claimed specifically in SN 740,143, filed June 5, 1958, by Joseph L. Maher and Richard F. Baker, and controlled in SN 740,144, filed June 5, 1958, by Edwards M. Fontaine and Earnest C. Hill both applications assigned to the assignee in the present case.

Essentially, motor-compressor 50 is a sliding vane type of motor on a common shaft with a sliding vane type of compressor. The compressor side of the unit receives the cool gas stream of conduit 38 and delivers it to conduit 51, connected directly to valve 40. Valve 40, as indicated heretofore, routes this gas output of the compressor to either conduit 42 or conduit 43.

The motor side of unit 50 is in a shunt conduit 52—53 around valve 54. Differential valve 54 is in conduit 5 and is positioned to regulate the amount of the main stream which is passed through conduit 52—53. Depending on the position of valve 54, more or less of the main stream gas is received by conduit 52 to develop the differential pressure force to regulate the speed of motor-compressor 50.

Valve 54 is normally modulated by the force developed from the differential pressures across orifice 56 in conduit 20. As the differential pressure across orifice 56 varies, the mechanism within controller 55 adjusts valve 54 to change the differential pressure across the motor of unit 50. Motor-compressor 50 thus has its speed adjusted to maintain the differential pressure across orifice 56.

*Orifice 56*

Orifice 56 is exposed to the variation in temperature of the regeneration gas as it is received from either conduit 45 or conduit 43. This flowing temperature of the captive regeneration stream thus varies the flow rate through this second circuit. Regulation of valve 54 from the differential across orifice 56 is in the correct direction to maintain the flow rate through orifice 56. As the flowing temperature decreases from the insertion of the gas stream of conduit 43 into conduit 20, motor-compressor 50 is caused to increase in output. The flow rate of the closed circuit goes up as the flowing temperature goes down. Alternately, as the heated stream of conduit 45 is caused to flow through orifice 56, the differential variation regulates valve 54 to slow motor-compressor 50 and decrease the flow rate through the closed second circuit. The result is automatic regulation in the correct direction to maintain the flow rate of regeneration gas required to efficiently strip the adsorbent material of the tower of water and hydrocarbons and cool the bed of material prior to its again receiving the main flow stream.

If the motor-compressor 50 experiences a sudden, or gradual, mechanical failure, the flow of regeneration gas will drop to a predetermined minimum value. At the predetermined minimum value, it is necessary to remove the motor-compressor from both circuits. Thus, the flow rate of gas in the regeneration circuit is a critical operative variable. The present invention utilizes the force of a predetermined value of this operative variable to convert the normally closed cycle of the regeneration system into an open cycle system, arrest the tower switching, and effectively remove the motor-compressor 50 from service. The regulation of valve 54, to develop the differential pressure force for circulating regeneration gas, continues on open, as well as closed, cycle operation.

Another operative variable of the regeneration gas is its temperature. The temperature of this gas going into the compressor side of unit 50 must be monitored so as to be maintained below a predetermined value. Under present design limitations, this temperature must not exceed 125° F. or the clearances between movable mechanical parts within the compressor side of unit 50 will be reduced until the parts are jammed together. Therefore, the temperature of the regeneration circuit is guarded by a mechanism responding to the effectiveness of the heat exchanger 30 to keep the temperature under control. Should this temperature exceed the predetermined limit, this operative variable will isolate the modulating impulse developed by flow in the regeneration circuit from valve 54 and cause the valve to open. This malfunction of the regeneration circuit is very serious. The entire system will shut down when the temperature to the compressor side exceeds the predetermined limit, and it will ordinarily be expected that a major repair or adjustment will have to be made to bring the temperature of the regeneration circuit down to normal.

The other temperature of the regeneration circuit which is most important is that of the towers, sensed by 41A. This temperature is in direct control of the impulses to the tower valves. Should this temperature be out of limits, both the tower valve switching and the cooling-heating valve switching are controlled directly to prevent excessive heat going down conduit 16 with the main stream.

*Cross-over conduit 57*

It has been described how the gas in the second circuit is alternately heated and cooled by the function of valve 40 either shunting the reactivation gas through heater 44 or directly to conduit 20. This alternate heating and cooling of the captive circuit results in the inventory of gaseous fluid in the circuit fluctuating as the volume of the circuit conduits and vessels remain constant. Transfer of gaseous fluid between the main and reactivation circuits is desirable. Conduit 57 provides a means for making this transfer of gas. Specifically, conduit 57 is connected to the input side of the motor of unit 50 and to the output side of the compressor of the unit. Through this conduit, the gases of the two circuits interchange as their volumes contract and expand relative to each other. The result is to provide an inventory of gas in the reactivation circuit which fluctuates as it functions to recover hydrocarbons and extract water from the main stream of gas.

Cross-over conduit 57 creates at least one problem when two-position tower valves are used. It will be recalled that the valves of the system alternating the connection of the main and reactivation gas streams between towers 8 and 9 are actuated simultaneously by the time-cycle controller 41. When these valves all shift from one of their positions to the other there is a finite period of time when they offer relatively little restriction to gas flow between the two circuits. Therefore, during each switching action, the differential in pressure between the two circuits causes a transfer of gas from the circuit of the higher pressure to the circuit of the lower pressure. This transfer reduces the pressure differential between conduits 52 and 53, across the motor of unit 50 as the gas of the main circuit surges through conduit 57. Motor-compressor 50 momentarily stops. After the valve shift is complete, the differential pressure is again developed across unit 50 and the unit begins to rotate with such sudden force as to place excessive mechanical strain on its parts. Therefore, a means is required to reduce the rate of transfer of gas through conduit 57 during tower valve shift.

It has been found desirable to include throttling valve 60 in conduit 57. Valve 60 may be manually adjusted to control the transfer rate through conduit 57 so the required minimum differential across the motor of unit 50 will be maintained during tower valve shift. The problem of motor-compressor failure from this cause is thereby solved.

Closed to open cycle conversion

Basically, to convert the closed cycle regeneration system of Figs. 1 and 2 to an open cycle regeneration system, it is necessary to connect conduit 52 to conduit 51 and conduit 38 to conduit 53. Cross-over conduit 57 normally connects conduits 52 and 51 through throttling valve 60. The present invention additionally provides conduit 61 between conduit 38 and conduit 53. A two-position valve 62 is provided in conduit 61. With conduits 57 and 61 connecting the main and regenerative streams as illustrated, regulation of valve 54 will force a portion of the main stream gas through the conduit 20 for regeneration and recovery of hydrocarbons. Of course, this connection returns this gas to the main stream of conduit 5 downstream of differential valve 54. Thus, the advantages of a closed, or captive, cycle are not realized. However, this alternate mode of operation does provide a means of maintaining the overall dehydration and hydrocarbon recovery system in operation when motor-compressor 50 fails or an operative variable of the closed cycle exceeds its predetermined limits. There remains, only the problem of removing the restriction to flow through conduit 57 and conduit 61 when the conversion is made.

Two-position valve 62 is opened by the control system in which the present invention is embodied. Valve 63 is provided as a by-pass around throttling valve 60. Valve 63 is opened at the same time valve 62 is opened to remove the restriction of valve 60 in conduit 57. In Fig. 2, both valve 62 and valve 63 are indicated as controlled in parallel by the mechanism at 55. In general, the conversion is made when the operative variable of flow decreases to a predetermined minimum value in the captive, regeneration, circuit. The various operating conditions of the Figs. 1 and 2 system which result in the low-flow conditions will be discussed more specifically in connection with the control system of Fig. 3.

When the operative variable of the regenerative circuit has caused the conversion from a closed to an open cycle type of reactivation system, it is desired to isolate motor-compressor 50 from the main and regeneration circuits. Therefore, valves 65, 66, 67 and 68 are indicated in the conduits to and from unit 50. These valves may be closed and unit 50 removed for service or replacement. It is feasible to automatically close valves 65—68 from the impulse developed to open valves 62 and 63. If it is uneconomical to provide the means to carry out this automatic function it may be accomplished by manually operated valves.

Temperature of the regeneration circuit

When the flow through orifice 56 was previously discussed, the operative variable of temperature in the regeneration circuit directly associated with motor-compressor 50 was seen as desirably monitored. In the specific form adopted for motor-compressor 50, it is desirable that the temperature to the compressor side be kept below 125° F. as explained previously.

Temperature responsive element 64 is placed in conduit 33 to respond to the effectiveness of heat exchanger 30 on the circuit directly associated with motor-compressor 50. This operative variable develops a force by the mechanism in unit 55 with which to open differential valve 54 to a maximum when the temperature of the gas in conduit 33 exceeds a predetermined maximum. The specific mechanism in control unit 55 which responds to element 64 to open valve 54 is disclosed in greater detail in Fig. 3.

Temperature responsive element 41A is placed in conduit 29 of the second circuit to respond to the temperature of the regeneration gas coming from either tower 8 or tower 9. This operative variable of the captive cycle develops a force through relays to maintain the tower valves at the position they had when the temperature exceeded its predetermined maximum value and maintain the valve 40 in the cooling position. The specific mechanism is control unit 41 and the pipe to the tower valves which responds to element 41A is disclosed in greater detail in Fig. 4.

Figs. 3 and 4

Figs. 3 and 4 must be taken together. Their structure is shown connected together by pipes for fluid pressure control signals. Together, these figures show in detail how the operative variables of the regenerative circuit, and the control impulses of the time-cycle controller 41, are applied to position differential valve 54, conversion valves 62 and 63, isolation valves 65—68, tower valves 10, 14, 23, 27, 11, 15, 24, 28 and heating-cooling valve 40 to carry out the objectives of the invention. The description in connection with Figs. 1 and 2 was comparatively general, dealing with the overall end results of functional relation between the primary elements with which the variables of flow and temperature are measured and the results of directing the flows of the first and second circuits with valves as the controlled elements. Figs 3 and 4 show just how the control impulses developed are co-ordinated to attain a cohesion of control actions in the system.

Controller 55

The diagrammatic block of controller 55 in Figs. 1 and 2 has been expanded into its various components in Fig. 3. The basic, normal, function of controller 55 is to produce a fluid pressure control signal with which to modulate the position of valve 54 in conduit 5. This fluid pressure is developed by orifice 56 in conduit 20.

In Fig. 3, conduit 20 is depicted with orifice 56 established to develop differential pressures related to flow rate through the orifice. These differential pressures are specifically applied as an input to a device which will develop fluid pressure values over a range corresponding to the range of differential pressure values. Diagrammatically, the essential elements of a force balance fluid pressure transmitter are indicated at 90. A specific device suitable for this purpose is manufactured by the Taylor Instrument Company, Rochester, New York and is shown in its Instruction Section 2B200, being designated as type 333R and marketed under the trademark Transaire.

Differential pressure transmitter 90 receives the pressures across orifice 56 in bellows 91 and 92. The force developed by these bellows on one end of beam 93 rotates the beam about its pivot. Beam 93 has a fluid pressure couple, in the form of a vane and nozzle, at the other end of the beam. The output fluid pressure developed by the vane and nozzle, supplied fluid pressure in the order of 20 p.s.i., is placed in conduit 94. The fluid pressure of conduit 94 is not only the output of the transmitter 90 but is routed by conduit 95 as an input to bellows 96 to balance the differential force of bellows 91 and 92 on beam 93. The variation of output fluid pressure in conduit 94 is thereby given a definite functional relation to the flow through orifice 56.

The fluid pressure signal of conduit 94 is applied in parallel to a flow controller 97 and a limit, or set point, controller 98. Controller 97 may be given the specific form of the Fulscope Controller manufactured by the Taylor Instrument Company and disclosed in its Instruction Section 1A204. In controller 97, the fluid pressure impulse of conduit 94 is received in bellows 99 to position a beam 100 against the compression force of the spring 101. Thus, a substantial range of movement is given beam 100 for development of various control actions such as proportional band, derivative, rate and reset in the output of the flow controller 97. Mechanisms for introducing the various control actions are not disclosed here. Only the motion of beam 100 by bellows 99 on one end, essential to develop an output from the nozzle-vane combination on the other end of the beam 100, is indicated. The fluid pressure output developed by controller 97 is established in conduit 102 and is applied to differential valve 54.

Parallel with the development of the fluid pressure output of conduit 102, set point controller 98 receives the fluid pressure of conduit 94 in bellows 103. A bellows 104 has a fluid pressure developed therein by throttling a fluid pressure supply through valve 105. Bellows 103 and 104 are mechanically linked to a flapper 106. Flapper 106 is positioned with respect to a vent nozzle 107 and the supply nozzle 108. The entire case of set point controller 98 contains the pressure developed by the co-operation between the vane 106 and nozzles 107, 108. This co-operation establishes a fluid pressure in conduit 109.

As disclosed, set point controller 98 compares the fluid pressure impulse developed in conduit 94 with the manually established fluid pressure in bellows 104. As long as the fluid pressure in conduit 94, representative of the flow through conduit 20, is above a predetermined minimum value, the vane 106 will be carried against vent nozzle 107 and the supply pressure of nozzle 108 will be established in conduit 109. Of course, when the fluid pressure in conduit 94 falls below a value predetermined by the adjustment of valve 105, vane 106 will be carried against supply nozzle 108 and conduit 109 will be vented to atmosphere. Thus, conduit 109 is maintained at either the supply pressure of nozzle 108 or at atmospheric pressure.

The fluid pressure supply of conduit 109 is simultaneously applied to two diaphragm operators. Diaphragm operator 110 has its stem urged upward by spring 111 and downward by the fluid pressure in conduit 109. The stem of operator 110 is shown in its lower position to which it is carried by the supply pressure in conduit 109. The stem of diaphragm operator 110 is mechanically connected to the stem of valve 112.

The valve 112 may take the form of a snap-acting valve manufactured by Barworth, Inc. and which is disclosed and claimed in U.S. Patent 2,860,660. For purposes of the present disclosure, it is necessary only to understand that the valve element 113 is carried between two positions by movement of the valve stem. Thus, the valve element 113 is alternately positioned to connect conduit 114 with supply pressure or to atmosphere through manually operated valve 115.

Conduit 114 supplies the diaphragms of valves 62, 63 and 65—68. Valves 62 and 63 are arranged to normally close under the force of their individual springs. The application of the supply pressure of conduit 114 to the underside of the diaphragms of these valves will open them and convert the closed cycle type of regeneration system of Fig. 1 to an open cycle type of regeneration system. Valves 65—68 are arranged to normally open under the force of their individual springs. The application of the supply pressure of conduit 114 to the top of the diaphragm of these valves will close them and isolate motor-compressor 50 from the first and second circuits.

Note should be taken of the fact that the conversion and isolation of valves 62, 63 and 65—68 is shown as a one-way function. Valve element 113 is shown in the normal position. The complete system is operating normally with the flow in the second circuit above the predetermined minimum limit established by valving supply pressure through 105 into bellows 104. Valve 115 has been opened to place atmospheric pressure in pipe 114 and closed. Therefore, when pipe 114 is placed in communication with supply pressure, the conversion and isolation takes place. However, a return of the flow in the regeneration circuit, and return of valve element 113 to the position shown, will leave the supply pressure trapped in pipe 114. This desired result will prevent automatic return of the system to the closed cycle type of reactivation system until visual inspection ascertains the cause of the low-flow in the regeneration circuit. Manual opening of valve 115 will then return the system to the normal, closed cycle type at the choice of operating personnel.

Of course, it is contemplated that the automatic isolation of the motor-compressor 50 with valves 65–68 could be eliminated and manually operated valves substituted for the diaphragm valves 65—68 shown. While the conversion and isolation functions of valves 62, 63 and 65—68 are taking place, differential valve 54 is modulating the flow of regeneration gas through the second circuit under the direction of the fluid pressure control signal developed in pipe 102. Thus the regeneration flow is controlled on both open and closed cycle operation, regardless of whether motor-compressor 50 is in the system, or isolated for repairs or replacement.

The fluid pressure control signal of pipe 102 is monitored by the temperature detected by element 64. The conversion-isolation fluid pressure control signal in pipe 109 is applied, as a monitor to the tower-switching valve system shown on Fig. 4. The monitoring by temperature element 64 in conduit 33 will be analyzed first.

The temperature sensed by element 64 is a first temperature of the regeneration circuit as an operative variable of the circuit. The fluid pressure established in pipe 102 by controller 97 is routed through a valve actuated by diaphragm operator 122 as long as the temperature sensed by element 64 is below a predetermined maximum value. Pipe 123 is connected to pipe 102 through the valve of diaphragm operator 122, and the modulating impulses from controller 97 are continuously applied to valve 54 regardless of whether or not the set point controller 98 converts the regeneration cycle to the open type.

Temperature element 64 specifically establishes its impulse in controller 125 which is similar to controller 97. The output of controller 125 is established in pipe 124 for application to diaphragm operator 122. As long as the temperature of the regeneration circuit remains below the predetermined maximum, element 64 can not develop a force to expand the bellows of controller 125 and place sufficient fluid pressure in pipe 124 to depress the stem of operator 122 against its spring force and shift its valve to disconnect pipes 102 and 123. However, temperature higher than the predetermined minimum will connect pipe 123 to supply and open valve 54 to its maximum to decrease the differential across the motor-compressor 50 and stop it. With motor-compressor 50 stopped, the flow in conduit 20 ceases, and the output of set-point controller 98, in pipe 109, goes to a minimum value and stays there. This impulse in pipe 109, as a monitoring impulse to the tower switching system, will now be considered.

It is desirable to "freeze" the actuation of the tower valve system at whatever position it assumes when the predetermined minimum flow of the regeneration circuit is reached and maintained. Therefore, when the flow through conduit 20 falls to the predetermined value, established by the setting of valve 105, the fluid pressure impulse in pipe 109 will cause valves 62 and 63 to open. The same fluid pressure impulse of 109 is simultaneously applied to a system of diaphragm operators which, with attached valves, will control the impulse in pipe 75 to maintain it at the value it had when the low-flow condition of the regenerative circuit occurred.

More specifically, pipe 109 is connected to diaphragm operator 117, by pipe 116, in parallel with diaphragm operator 110. Diaphragm operator 117 actuates its valve to normally block one end of pipe 118. The other end of pipe 118 is connected to the valve of a diaphragm operator 119 so that alternate positions of diaphragm operator 119 will connect its end of pipe 118 to supply pressure or vent it to atmosphere. Diaphragm operator 119 is connected to pipe 75 by pipe 120 so that fluctuation of the fluid pressure in pipe 75 between supply and atmosphere pressure will actuate the valve of diaphragm operator 119 to position its valve so it will connect a fluid pressure supply to its end of pipe 118 or vent its end of pipe 118 to atmosphere. When the value of the fluid pressure in pipe 109 falls to the atmospheric value, diaphragm operator 117 connects its end of pipe 118 to pipe 75 through its valve and pipe 121.

By connecting pipe 118 to pipes 121 and 75, diaphragm operator 119 maintains the pressure of pipe 75 at either its maximum or minimum value, depending upon which value existed at the time the connection was made. If the diaphragm operator 119 was pressured to the maximum value of the pressure in pipe 75, pipe 118 would connect the supply pressure through the valve of diaphragm operator 119 into pipes 121 and 75 so that this pressure would be maintained in pipe 75. If, at the time the connection to pipe 118 was made, the value of the pressure in pipe 75 was at a minimum, diaphragm operator 119 would keep pipe 75 vented to atmosphere, through pipe 118. Thus, when the low-flow condition occurred in conduit 20 of the regeneration circuit, the cycle will be converted to an open cycle from a closed cycle and the tower switching will be stopped at the position during which the malfunction occurred if the flow condition continued to be low. However, during the open cycle condition, regulation of valve 54 will continue under the modulation of the output of controller 97 if the flow increases above the low-flow condition and the temperature of the regeneration circuit remains below a predetermined minimum.

*Time-cycle controller 41*

Pipe 75 is cycled between the maximum pressure of supply and the minimum pressure of atmosphere by one of the two output control impulses of time-cycle controller 41. In Fig. 4 time-cycle controller 41 is shown in sufficient detail to illustrate the control impulses developed, and co-ordinated, to actuate the tower valves 10, 14, 23, 27, 11, 15, 24, 28 and heating-cooling valve 40 in the regenerative circuit.

The second of the two impulses switches valve 40 to alternately route the regenerative gas of conduit 51 to conduits 42 and 43. The first impulse is developed to simultaneously actuate each of tower valves 10, 11, 14, 15, 23, 24, 27 and 28 between their two positions in alternately routing the main and regenerative streams through the towers 8 and 9.

The second control impulse to valve 40 is co-ordinated with the first impulse to the tower valves. It provides for hot regenerative gas to be first directed through one of the adsorbent beds. It then provides for cool regenerative gas to reduce the bed temperature before the main stream is switched to the tower.

The co-ordination of the development of the two impulses of controller 41 is illustrated by two cams mechanically linked together. Cams 70 and 71 are mounted on a common shaft 72 so they will be turned together at a predetermined rate by a motor. The lobes of cams 70 and 71 actuate separate vane-nozzle combinations to develop fluid pressures as the impulses to actuate their respective valves. Specifically, vane 73 is carried between two positions by the profile of cam 70 to alternately advance and retreat from nozzle 74. Nozzle 74 is supplied the fluid pressure in the order of 20 p.s.i. through an orifice restriction and the back pressure developed by the vane 73, advanced to cover nozzle 74, is transmitted by pipe 75 to the tower valve system. Cam 71 is shown related to a nozzle-vane in such a way that it can develop a similar fluid pressure to be applied to the diaphragm of valve 40.

Pipe 75 is connected to the diaphragm of valve 76. Valve 76 has two positions which alternately route the supply of fluid pressure to pipes 77 and 78. As shown in Fig. 4, a spring 79 can position the valve stem of 76 upward to move its land to where it will block the port to pipe 77. When the port to pipe 77 is blocked, the supply pressure is applied to pipe 78. The supply pressure in pipe 78 is simultaneously applied to the tower valves through the connection shown in Fig. 4.

The valves are grouped with respect to towers 8 and 9 and with respect to those groups controlling the main and regenerative streams to each of the towers. Thus, in co-ordination with Figs. 1 and 2 the supply pressure in 78 is shown as applied to the bottom of the diaphragms of valves 10 and 14 to open these valves and connect the main stream to conduits 6, 12 and 16 so the stream will flow through tower 8. Simultaneously, valves 23 and 27 are closed by reason of the fluid pressure in pipe 78 being applied to the top of their diaphragms. The similar groups of valves on tower 9 are simultaneously actuated by the fluid pressure of pipe 78 in order to pass the regenerative stream of gas through tower 9.

During the period illustrated by Figs. 1 and 2, the regenerative stream is passing through tower 9 for the reason that valves 24 and 28 are open while valves 11 and 15 are closed. These valves of tower 9 are in this position because spring 79 has been overcome to position the stem of valve 76 upward. Spring 79 is able to position the stem of 76 downward when the fluid pressure impulse in pipe 75 is at a minimum. The impulse in conduit 75 is shown at a maximum because flapper 73 is at its minimum distance from nozzle 74 by reason of its contact with the smaller radius of cam 70.

During the period of time that flapper 73 rides on the low position of cam 70, cam 71 turns its profile with respect to its flapper to develop a fluid pressure for the diaphragm of valve 40 which will position it to first shunt the regenerative gas through heater 44 and then pass the unheated gas of the regenerative cycle through tower 9. Roughly, the heating and cooling periods of regenerative gas passing through tower 9 are evenly divided over the total period the regenerative gas passes through tower 9.

The present invention contemplates that the fluid pressure impulses developed in pipe 75 will be controlled when an operative variable of the regenerative circuit exceeds a predetermined value. Specifically, Fig. 3 illustrates a system for maintaining the positions attained by the valves of Fig. 4 when the flow through regenerative cycle conduit 20 falls to a predetermined minimum value. The motive means for the time-cycle controller 41 will continue to rotate cams 70 and 71 at a constant rate but the control system in which the invention is embodied will manipulate the first impulse developed by cam 70 to maintain the tower valves in their open or closed position occupied when the flow through conduit 20 fell to its predetermined minimum value.

The present invention also contemplates that the second fluid pressure impulse developed by cam 71, of controller 41, for heating-cooling valve 40, will be controlled when an operative variable of the regenerative circuit reaches a predetermined value. The operative variable applied as a monitor is, specifically, the temperature in conduit 29 as this conduit 29 carries the gas of the regenerative circuit away from the beds of towers 8 or 9. This second temperature of the second circuit is also used to simultaneously monitor the tower valve switching. The result achieved is to hold the bed receiving cool regeneration gas in the second circuit, and connected to the source of cooling gas, until it lowers to at least a predetermined relatively cool temperature at which the bed can be connected to the main stream without dumping a dangerous amount of heat down the main stream. The danger of injury to downstream equipment with excessive heat has been discussed.

In Fig. 4, conduit 29 is shown with temperature responsive element 41A sensing the temperature of the regenerative stream. Cam 71 is rotated to permit flapper 130 to be positioned by its spring so the flapper and nozzle 131 are brought together to develop the highest value of fluid pressure impulse possible in pipe 132. This fluid pressure control signal is conducted into pipe 133, and applied to the diaphragm of valve 40 to connect conduit 51 to conduit 42. Thus cooling-heating valve 40 routes the regeneration gas going to tower 9 through heater 44. This heated gas passes into tower 9 to desorb the products deposited in the adsorbent bed by the processed gas.

Temperature element 41A is responding to the coolest temperature of gas in conduit 29 at the time in the cycle illustrated in the drawings. Therefore, element 41A is developing its smallest amount of power on bellows 134. Flapper-beam 135 is positioned by its spring to so restrict the flow from nozzle 136 as to develop the maximum output of transmitter 137.

The output fluid pressure signal of transmitter 137 in pipe 138 is applied, in parallel, simultaneously, to diaphragm operators 139 and 140. The relay of diaphragm operator 139 connects pipe 133 to either pipe 132 or exhaust. The relay of diaphragm operator 140 is in pipe 75 so it either permits the first control impulses from time-cycle controller 41 to be applied to tower shifting valve 76 or it traps the control impulse on the diaphragm of valve 76 which is developed at the time the valve of diaphragm operator 140 changes position.

In Fig. 4, both diaphragm operator 139 and 140 are pressured from transmitter 137 to permit the two output impulses of controller 41 to position their respective valves. This condition will continue as the cams 70 and 71 rotate to where the lobe of cam 71 will bleed pipes 132 and 133 to exhaust and cause heating-cooling valve 40 to shift to cool the regenerative gas through tower 9. During the next cooling portion of the cycle, the temperature at element 41A will reach a predetermined high value which will expand bellows 134 and exhaust pipe 138.

When diaphragm operators 139 and 140 have their inputs dropped to atmospheric values, pipe 133 will be connected to exhaust and the diaphragm of valve 76 will have the fluid pressure control impulse placed on it by controller 41 trapped thereon. Until the temperature at element 41A lowers to a predetermined value heating-cooling valve 40 will continue to cool the regenerative gas and the tower valves will hold their position.

If the time the cooling lobe of cam 71 is held against flapper 130 is not as long as the time it takes tower 9 to get down to temperature, the subsequent heating cycle for tower 9 will be shorter than normal. However, the short heating cycle will probably result in tower 9 getting down to the required temperature in adequate time. If the cooling time required for tower 9 is again longer than desired, the system can be inspected for the cause of the unbalance. However, the error between cam time and actual time does not become cumulative.

*Review of operation*

The control system of the dehydration and hydrocarbon recovery system of Fig. 1 responds to three variables of its regeneration circuit while automatically shifting the main stream and regeneration stream between the towers containing adsorbent beds. The automatic shifting of the tower valves is co-ordinated with alternately heating and cooling the regeneration gas so the tower beds will be cooled after the heated regeneration gas has vaporized the water and hydrocarbons from the bed. The system is normally operated as a closed type. The regeneration gas is continuously circulated in a closed circuit to perform its function.

If the flow through the regeneration circuit decreases below a predetermined value the system is connected as an open cycle. The motor-compressor is isolated from the system. The flow in the regeneration circuit in regained on open cycle. The regulation of the flow with a differential valve in the main circuit continues, whether the system is on open or closed cycle. If the cause of low flow is the motor-compressor, mechanically linking the main and regenerative circuits, it may be removed when the system is on open cycle to be repaired, or replaced.

If the temperature of the regenerative circuit directly affecting the motor-compressor exceeds a safe valve the differential valve is opened. Keeping the differential valve open by this temperature will keep the system shut down. A system of relays is provided to hold the tower valves at the position they attained when the system shut down because of low-flow in the regeneration circuit. A detailed inspection is required when this excessive temperature develops. The system can then be started up again after repairs.

The temperature of the regeneration circuit which is a direct reflection of bed temperature continuously monitors both the impulse for the heating-cooling valve for the regeneration gas and the impulse for the shifting of the tower valves. If a bed does not cool below a predetermined level it is held on cooling to safeguard dumping its heat into the downstream conduit.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for removing water vapor and condensable hydrocarbons from natural gas including, a bed of adsorbent material which will remove water and hydrocarbons from natural gas upon contact, a first circuit conducting natural gases through the bed of adsorbent material, a second circuit arranged to alternately conduct reactivating gas through the bed of adsorbent material, means for heating and cooling the reactivating gas in the second circuit, a compressor in the second circuit to circulate the reactivating gas through the second circuit, a motor in the first circuit powered by the energy of the gas flowing therein, a mechanical link between the compressor and motor through which the compressor is powered, means establishing communication between the compressor output in the second circuit and the motor input, a conduit between the compressor input in the second circuit and the motor output in the first circuit, a valve in the conduit, and means responsive to operative variables of the second circuit to effectively open the valve in the conduit when one of the variables reaches a predetermined value.

2. The apparatus of claim 1 in which the valve is normally closed and an operative variable to which the means is responsive is the flow of reactivating gas in the second circuit.

3. The apparatus of claim 1 in which the valve is normally closed and an operative variable to which the means is responsive is a temperature of the reactivating gas in the second circuit.

4. Apparatus for removing water vapor and condensable hydrocarbons from natural gas including, a bed of adsorbent material which will remove water and hydrocarbons from natural gas upon contact,
a first circuit conducting natural gases through the bed of adsorbent material,
a second circuit arranged to alternately conduit reactivating gas through the bed of adsorbent material,
means for heating and cooling the reactivating gas in the second circuit,
a compressor in the second circuit to circulate the reactivating gas through the second circuit,
a motor in the first circuit powered by the energy of the gas flowing therein,
a mechanical link between the compressor and motor through which the compressor is powered,
a first conduit between the first and second circuits through which gas is exchanged as the gas of the second circuit is heated and cooled, and
a first throttling valve in the first conduit to maintain a minimum differential of pressure across the motor in the first circuit as the circuits are alternated to conduct their gases through the bed of adsorbent material.

5. The apparatus of claim 4 including, a by-pass valve which is normally closed in a conduit around the first throttling valve and which is arranged to open when an operative variable of the second circuit reaches a predetermined value.

6. The apparatus of claim 5 including, a second conduit from the inlet to the compressor to the outlet from the motor,
a valve which is normally closed in the second conduit,
and means responsive to an operative variable of the second circuit to simultaneously open the by-pass valve and the valve in the second conduit when one of the operative variables of the second circuit reaches a predetermined value.

7. The apparatus of claim 6 in which an operative variable to which the means is responsive is the flow of reactivating gas in the second circuit.

8. The apparatus of claim 6 in which the operative variable to which the means is responsive is a temperature of the reactivating gas in the second circuit.

9. The apparatus of claim 6 including a normally open valve in each inlet and outlet of the motor and compressor located between the motor-compressor and the first and second conduits.

10. The apparatus of claim 9 in which the means responsive to an operative variable of the second circuit closes all the valves in the inlets and outlets of the motor and compressor at the same time the responsive means simultaneously opens the by-pass valve and the valve in the second conduit.

11. The apparatus of claim 10 in which the means closing all the valves in the inlets and outlets of the motor and compressor at the same time the by-pass valve and the valve in the second conduit are simultaneously opened responds to the flow of reactivating gas in the second circuit.

12. The apparatus of claim 10 in which the means of closing all the valves in the inlets and outlets of the motor and compressor at the same time the by-pass valve and the valve in the second conduit are simultaneously opened responds to a temperature of the reactivating gas in the second circuit.

13. Apparatus for removing water vapor and condensable hydrocarbons from natural gas including, a bed of adsorbent material which will remove water and hydrocarbons from natural gas upon contact,
a first circuit contacting the bed of adsorbent material with natural gas,
a second circuit arranged to alternately contact the bed of adsorbent material with reactivating gas,
means for heating and cooling the reactivating gas in the second circuit,
a mechanical connection between the first and second circuit to utilize the energy of the gas in the first circuit to circulate the reactivating gas through the second circuit,
a valve system controlled on a time-cycle basis to alternately connect the first and second circuits with the bed of adsorbent material so they will contact the bed of adsorbent material with the gases of the first and second circuits, and means responsive to operative variables of reactivating gas in the second circuit to maintain the valve system in its position assumed at the time one of the operative variables attains a predetermined value.

14. The apparatus of claim 13 in which the valves of the system are two-position valves which alternately connect the first and second circuits to the bed of adsorbent material under the control of an impulse from a time-cycle controller, and the means responsive to operative variables controls the impulses from the time-cycle controller in accordance with the flow of reactivating gas in the second circuit as a first operative variable to maintain the valve system in the position it assumed when the flow of reactivating gas attained the predetermined value and for the time the flow of reactivating gas is at and within a predetermined range of values including the predetermined value.

15. The apparatus of claim 13 in which the means is responsive to temperature of the reactivating gas in the second circuit as a second operative variable to maintain the valve system in the position it assumed when the temperature of the activating gas attained the predetermined value.

16. The apparatus of claim 15 in which the temperature of the reactivating gas in the second circuit affects the function of the mechanical connection with which the energy of the gas in the first circuit is used to circulate the reactivating gas through the second circuit.

17. The apparatus of claim 15 in which the temperature of the reactivating gas in the second circuit is the temperature of the reactivating gas directly from the bed of adsorbent material, and second responsive means is provided to respond to the temperature of the reactivating gas from the bed of adsorbent material which will isolate the heating means from the reactivating gas and continuously apply the cooling means to the reactivating means during the period of the temperature from the bed is at or above a predetermined value.

18. Apparatus recovering condensable hydrocarbons from a gaseous stream including, a bed of adsorbent material which will remove hydrocarbons from a gaseous stream upon contact,
a first circuit which contacts the bed of adsorbent material with a gaseous stream containing condensable hydrocarbons,
a second circuit which contacts the bed of adsorbent material with reactivating gas,
means with which to alternately heat and cool the reactivating gas in the second circuit, a motor-compressor driven by the energy in the gas of the first circuit and driving the reactivating gas of the second circuit, a valve system between the first and second circuits and the bed of adsorbent material alternately positioned to attach the circuits to the bed, a heating-cooling valve alternately applying the heating and cooling means to the reactivating gas in the second circuit to recover condensable hydrocarbons from the adsorbent bed contacted, a time-cycle controller developing impulses to control the valve-system of the bed and the heating-cooling valve in the sequence which will cause the bed to remove hydrocarbons from the gas of the first circuit and deliver them to the gas of the second circuit, and a controller responsive to the flow of the reactivating gas in the second circuit to connect the first and second circuits in the unrestricted arrangement of an open cycle system when the flow falls to a predetermined minimum.

19. The apparatus of claim 18 in which the controller includes means for manually disconnecting the first and second circuits from their open cycle system and returning them to their closed cycle system.

20. The apparatus of claim 19 in which the controller contains a relay responsive to a first temperature of the reactivating gas which interrupts the impulse from the controller to a modulating valve in the first circuit to stop the motor-compressor when the temperature reaches a predetermined maximum.

21. The apparatus of claim 20 in which the controller contains a relay system which controls the impulses of the time-cycle controller to hold the valve system of the bed in the position attained when the flow of the reactivating gas falls to the predetermined minimum at which conversion to an open cycle system takes place.

22. The apparatus of claim 21 in which the time-cycle controller contains a relay system which responds to a second temperature of the reactivating gas to simultaneously hold the valve system of the bed in the position attained when the second temperature of the reactivating gas falls to a predetermined minimum and positions the heating-cooling valve to continuously cool the reactivating gas.

23. The apparatus of claim 22 in which the first temperature of the reactivating gas affects the function of the motor-compressor and the second temperature of the reactivating gas is the temperature of gas directly from the bed of adsorbent material.

24. Apparatus for removing water vapor and condensable hydrocarbons from natural gas including, a bed of adsorbent material which will remove water and hydrocarbons from natural gas upon contact, a first circuit conducting natural gases through the bed of adsorbent material, a second circuit arranged to alternately conduct reactivating gas through the bed of adsorbent material, means for heating and cooling the reactivating gas in the second circuit, a compressor in the second circuit driven to circulate the reactivating gas through the second circuit, a first valve in the first circuit arranged to be modulated in establishing a pressure differential in the first circuit, a first conduit connected to the first circuit upstream of the valve and to the second circuit downstream of the compressor, a second conduit connected to the first circuit downstream of the valve and to the second circuit upstream of the compressor, a second valve in one of the conduits which is normally closed, and means responsive to an operative variable of the second circuit to open the second valve when one of the operative variables of the second circuit reaches a predetermined value.

25. The apparatus of claim 24 in which an operative variable to which the means is responsive is the flow of reactivating gas in the second circuit.

26. The apparatus of claim 24 in which an operative variable to which the means is responsive is a temperature of the reactivating gas in the second circuit.

27. Apparatus for removing water vapor and condensable hydrocarbons from natural gas including, a bed of adsorbent material which will remove water and hydrocarbons from natural gas upon contact, a first circuit contacting the bed of adsorbent material with natural gas, a second circuit arranged to alternately contact the bed of adsorbent material with reactivating gas, means for heating and cooling the reactivating gas in the second circuit, a compressor in the second circuit to circulate the reactivating gas in the second circuit, a valve system controlled on a time-cycle basis to alternately connect the first and second circuits with the bed of adsorbent material so they will contact the bed of adsorbent material with the gases of the first and second circuits, and means responsive to operative variables of reactivating gas in the second circuit to maintain the valve system in its position assumed at the time one of the operative variables attains a predetermined value.

28. The apparatus of claim 27 in which the valves of the system are two-position valves which alternately connect the first and second circuits to the bed of adsorbent material under the control of an impulse from a time-cycle controller, and the means responsive to operative variables controls the impulses from the time-cycle controller in accordance with the flow of reactivating gas in the second circuit as a first operative variable to maintain the valve system in the position it assumed when the flow of reactivating gas attained the predetermined value and for the time the flow of reactivating gas is at and within a predetermined range of values including the predetermined value.

29. The apparatus of claim 27 in which the means is responsive to temperature of the reactivating gas in the second circuit as a second operative variable to maintain the valve system in the position it assumed when the temperature of the reactivating gas attained the predetermined value.

30. The apparatus of claim 29 in which the temperature of the reactivating gas in the second circuit affects the function of the compressor.

31. The apparatus of claim 29 in which the temperature of the reactivating gas in the second circuit is the temperature of the reactivating gas directly from the bed of adsorbent material, and second responsive means is provided to respond to the temperature of the reactivating gas from the bed of adsorbent material which will isolate the heating means from the reactivating gas and continuously apply the cooling means to the reactivating means during the period the temperature from the bed is at or above a predetermined value.

32. Apparatus recovering condensable hydrocarbons from a gaseous stream including, a bed of adsorbent material which will remove hydrocarbons from a gaseous stream upon contact, a first circuit which contacts the bed of adsorbent material with a gaseous stream containing condensable hydrocarbons, a second circuit which contacts the bed of adsorbent material with reactivating gas, means with which to alternately heat and cool the reactivating gas in the second circuit, a compressor in the second circuit to circulate the reactivating gas in the second circuit, a valve system between the first and second circuits and the bed of adsorbent material alternately positioned to attach the circuits to the bed, a heating-cooling valve alternately applying the heating and cooling means to the reactivating gas in the second circuit to recover condensable hydrocarbons from the adsorbent bed contacted, a time-cycle controller developing impulses to control the valve-system of the bed and the heating-cooling valve in the sequence which will cause the bed to remove hydrocarbons from the gas of the first circuit and deliver them to the gas of the second circuit, and a controller responsive to the flow of the reactivating gas in the second circuit to connect the first and second circuits in the unrestricted arrangement of an open cycle system when the flow falls to a predetermined minimum.

33. The apparatus of claim 32 in which the controller includes means for manually disconnecting the first and second circuits from their open cycle system and returning them to their closed cycle system.

34. The apparatus of claim 33 in which the controller contains a relay responsive to a first temperature of the reactivating gas which interrupts the impulse from the controller to a modulating valve in the first circuit to stop the compressor when the temperature reaches a predetermined maximum.

35. The apparatus of claim 34 in which the controller contains a relay system which controls the impulses of the time-cycle controller to hold the valve system of the bed in the position attained when the flow of the reactivating gas falls to the predetermined minimum at which conversion to an open cycle system takes place.

36. The apparatus of claim 35 in which the time-cycle controller contains a relay system which responds to a second temperature of the reactivating gas to simultaneously hold the valve system of the bed in the position attained when the second temperature of the reactivating gas falls to a predetermined minimum and positions the heating-cooling valve to continuously cool the reactivating gas.

37. The apparatus of claim 36 in which the first temperature of the reactivating gas affects the function of the compressor and the second temperature of the reactivating gas is the temperature of gas directly from the bed of adsorbent material.

38. Apparatus for removing water vapor and condensable hydrocarbons from natural gas including, a first bed of adsorbent material which will remove water and hydrocarbons from natural gas upon contact, a second bed of adsorbent material which will remove water and hydrocarbons from natural gas upon contact, a first circuit conducting natural gases through the first bed of adsorbent material, a second circuit conducting reactivating gas through the second bed of adsorbent material, means for alternately connecting the beds and circuits, means for heating and cooling the reactivating gas in the second circuit, a compressor in the second circuit to circulate the reactivating gas through the second circuit, a motor in the first circuit powered by the energy of the gas flowing therein, a mechanical link between the compressor and motor through which the compressor is powered, means establishing communication between the compressor output in the second circuit and the motor input, a conduit between the compressor input in the second circuit and the motor output in the first circuit, a valve in the conduit, and means responsive to operative variables of the second circuit to effectively open the valve in the conduit when one of the variables reaches a predetermined value.

39. Apparatus for removing water vapor and condensable hydrocarbons from natural gas including, a first bed of adsorbent material which will remove water and hydrocarbons from natural gas upon contact, a second bed of adsorbent material which will remove water and hydrocarbons from natural gas upon contact, a first circuit conducting natural gases through the first bed of adsorbent material, a second circuit conducting reactivating gas through the second bed of adsorbent material, means for alternately connecting the beds and circuits, means for heating and cooling the reactivating gas in the second circuit, a compressor in the second circuit to circulate the reactivating gas through the second circuit, a first valve in the first circuit arranged to be modulated in establishing a pressure differential in the first circuit, a first conduit connected to the first circuit upstream of the valve and to the second circuit downstream of the compressor, a second conduit connected to the first circuit downstream of the valve and to the second circuit upstream of the compressor, a second valve in one of the conduits which is normally closed, and means responsive to an operative variable of the second circuit to open the second valve when one of the operative variables of the second circuit reaches a predetermined value.

References Cited in the file of this patent

UNITED STATES PATENTS

| 1,721,033 | Okochi | July 16, 1929 |
| 2,248,956 | Carvlin | July 15, 1941 |
| 2,588,296 | Russell | Mar. 4, 1952 |
| 2,815,089 | Turner | Dec. 3, 1957 |
| 2,880,818 | Dow | Apr. 7, 1959 |

OTHER REFERENCES

Oil and Gas Jour. Article, by C. R. Hetherington, vol. 51, November 10, 1952, pages 96 to 99, 119, 120.

Petroleum Refiner Article by W. M. Dow, vol. 36, No. 4, April 1957, pages 141 to 145.